US006827289B2

(12) United States Patent
Filicicchia et al.

(10) Patent No.: US 6,827,289 B2
(45) Date of Patent: *Dec. 7, 2004

(54) SPRAY APPARATUS WITH MULTIPLE PRESSURIZABLE TANK LIQUID SUPPLY SYSTEM

(75) Inventors: Daniel J. Filicicchia, Londonderry, NH (US); Michel R. Thenin, Nashua, NH (US); Robert L. Trottier, Nashua, NH (US)

(73) Assignee: Spraying Systems Co., Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/395,563

(22) Filed: Mar. 24, 2003

(65) Prior Publication Data

US 2003/0213855 A1 Nov. 20, 2003

Related U.S. Application Data

(63) Continuation-in-part of application No. 10/145,843, filed on May 14, 2002, now Pat. No. 6,536,683.

(51) Int. Cl.[7] .................................................. B05B 9/00
(52) U.S. Cl. ........................... 239/124; 239/67; 239/69; 239/305
(58) Field of Search ............................... 239/67, 68, 69, 239/63, 302, 303, 305, 127, 125, 124, 143, 148, 142; 142/142; 222/318

(56) References Cited

U.S. PATENT DOCUMENTS

| 3,857,515 | A | * | 12/1974 | Zennie | ........................ 239/169 |
|---|---|---|---|---|---|
| 4,565,160 | A | * | 1/1986 | Cook | .......................... 119/665 |
| 4,638,924 | A | | 1/1987 | Newsom | |
| 4,904,505 | A | | 2/1990 | Ison et al. | |
| 4,948,042 | A | * | 8/1990 | Tench et al. | ................. 239/113 |
| 5,152,461 | A | * | 10/1992 | Proctor | ....................... 239/304 |
| 5,445,674 | A | | 8/1995 | DeMars | |
| 5,577,945 | A | * | 11/1996 | LaBelle | ........................ 446/75 |
| 5,656,035 | A | * | 8/1997 | Avoy | ........................... 604/191 |
| 5,683,173 | A | * | 11/1997 | Gronet et al. | ................ 362/294 |
| 5,906,318 | A | * | 5/1999 | Gurko et al. | ................ 239/304 |
| 6,067,906 | A | | 5/2000 | Ryan et al. | |
| 6,536,683 | B1 | | 3/2003 | Filicicchia et al. | |

FOREIGN PATENT DOCUMENTS

EP 0649682 A2 * 4/1995
JP 355114366 A * 9/1980

* cited by examiner

*Primary Examiner*—William Doerrler
*Assistant Examiner*—Mohammad M. Ali
(74) *Attorney, Agent, or Firm*—Leydig, Voit & Mayer, Ltd.

(57) ABSTRACT

A liquid spraying system having a spray head and a recirculating liquid supply system for directing pressurized supply liquid to the spray head with a portion of the liquid being directed from the spray head as a discharging spray and a portion of the supply liquid exiting the spray head as a return liquid. The liquid supply system includes two separate selectively pressurizable liquid containable tanks each having a respective fluid conduit coupled to the spray head. The liquid supply system has (1) a first cycle of operation in which the first tank is pressurized and the second tank is depressurized so that pressurized liquid is supplied from the first tank to the spray head and return liquid is directed to the second tank, and (2) a second cycle of operation in which the second tank is pressurized and the first tank depressurized so that liquid is supplied to the spray head from the second tank and return liquid is directed to the first tank.

28 Claims, 7 Drawing Sheets

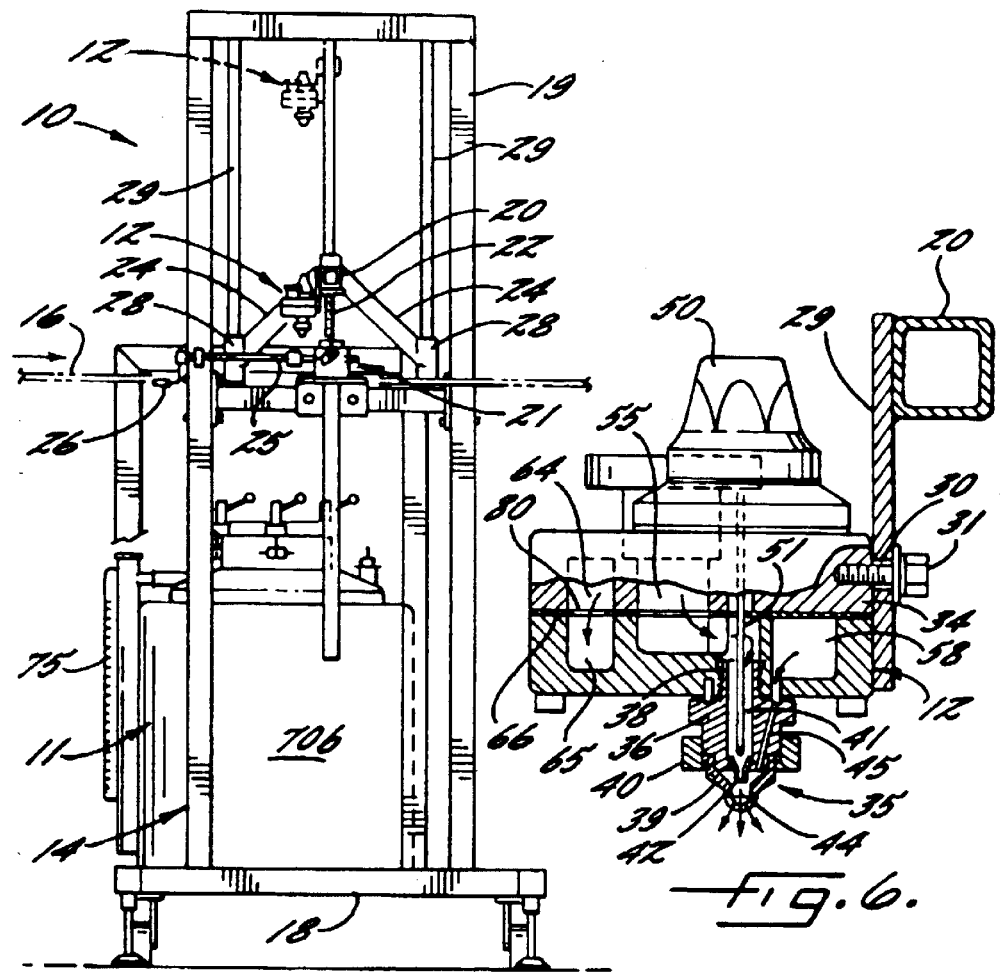
Fig. 3.
Fig. 6.
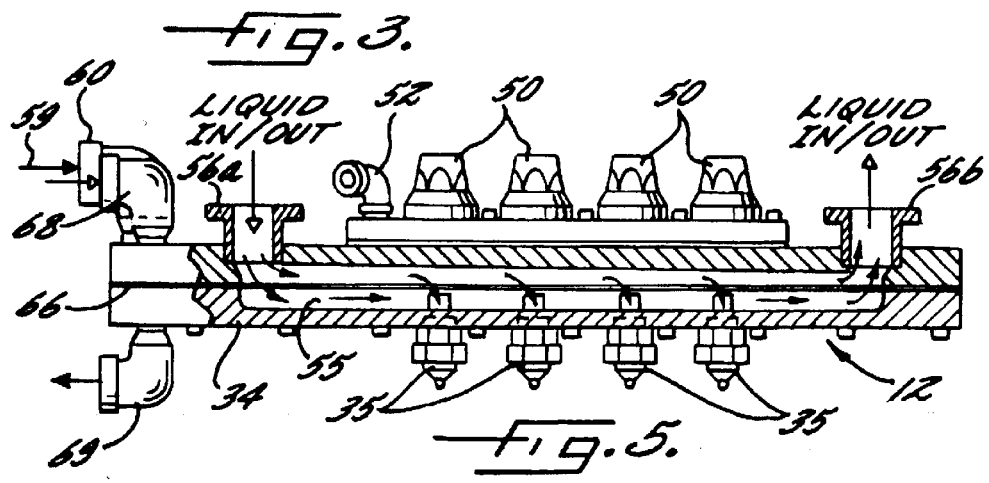
Fig. 5.

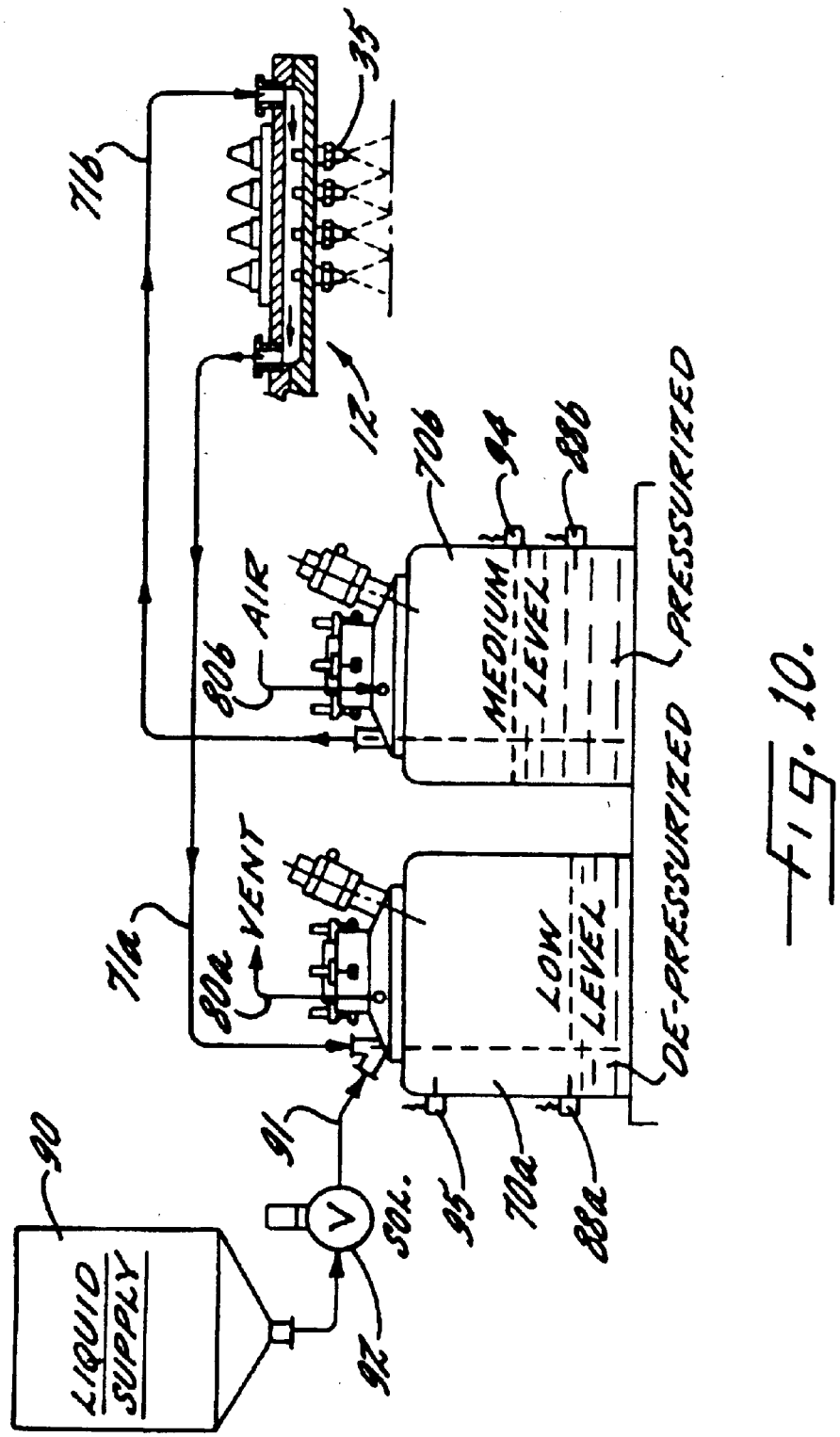

SPRAY APPARATUS WITH MULTIPLE PRESSURIZABLE TANK LIQUID SUPPLY SYSTEM

RELATED APPLICATION

The present application is a continuation-in-part of application Ser. No. 10/145,843 filed on May 14, 2002 now U.S. Pat. No. 6,536,683.

FIELD OF THE INVENTION

The present invention relates generally to spraying systems, and more particularly, to spraying systems in which the supply liquid, in part, is recirculated during the spraying operation.

BACKGROUND OF THE INVENTION

When spraying tyxotropic liquids which have a tendency to crystallize or solidify, such as liquid chocolate, the supply liquid must be heated and recirculated during the spraying operation so that the liquid stays above a crystallization temperature and remains in motion at all times. If the liquid dead-ends at the nozzle or spray header, and hence ceases to circulate, clogging is likely to occur.

Typically, the supply liquid is provided in an open tank from which it is pumped to the spray nozzle or header. Excess liquid that proceeds past the spray nozzle or header is returned back to the open tank for reuse. Such system is disadvantageous because the pumps are relatively expensive and difficult to heat. It also is difficult to inexpensively control the pressurized liquid supply in such system. In some instances, the supply liquid is provided in a pressurized supply tank. Pressure in the tank directs the liquid to the spray nozzle or header, with excess liquid being returned to an open tank. In this case, the return liquid must be poured into the existing or a new pressurizable supply tank. This repeating procedure can be tedious, time consuming, and disruptive of the spraying operation.

OBJECTS AND SUMMARY OF THE INVENTION

It is an object of the present invention to provide a spraying apparatus with a liquid supply and circulation system, particularly adapted for use with tyxotropic liquids, which eliminates both costly pumps and the tedious handling of return liquid from the spray nozzle or header.

Another object is to provide a spraying apparatus with a liquid supply and circulation system as characterized above which can be operated on a substantially uninterrupted basis.

A further object is to provide a spraying apparatus with a liquid supply and circulation system of the foregoing type in which the return liquid may be redirected to the spray nozzle or header without significant interruption in the spray operation.

Still another object is to provide a spraying apparatus with a liquid supply and circulation system of the above kind which includes a plurality of pressurizable liquid supply and liquid return tanks which can be alternatively and successively used for supplying pressurized liquid to the spray nozzle or header without substantial interruption in the spraying operation.

Yet another object is to provide a spraying apparatus which includes an auxiliary liquid supply tank that is adapted for automatically refilling at least one of the plurality of pressurizable liquid supply and return tanks. A related object is to provide such a spraying apparatus in which the auxiliary liquid supply tank can be selectively coupled to any one of the plurality of liquid supply and return tanks for refilling the selected tank without operation of the spraying apparatus.

Yet a further object is to provide a novel method of supplying liquid to a spray head utilizing a multiplicity of pressurizable liquid containable tanks.

Other objects and advantages of the invention will become apparent upon reading the following detailed description and upon reference to the drawings, in which:

BRIEF DESCRIPTION OF THE DRAWINGS

FIG. 3. is an end elevational view of the illustrated spraying apparatus, taken in the plane of line 3—3 in FIG. 1;

FIG. 4 is an enlarged perspective of the spray header of the illustrated spraying apparatus;

FIG. 5 is a longitudinal, vertical section of the spray header taken in the plane of line 5—5 in FIG. 4;

FIG. 6 is an enlarged transverse vertical section of the spray header, taken in the plane of line 6—6 in FIG. 4;

FIG. 10 is a partially diagrammatical illustration of an alternative embodiment of liquid supply and recirculation system in accordance with the invention, which in this case includes an auxiliary liquid supply tank for automatically replenishing supply liquid to the spraying apparatus;

Figure 1:
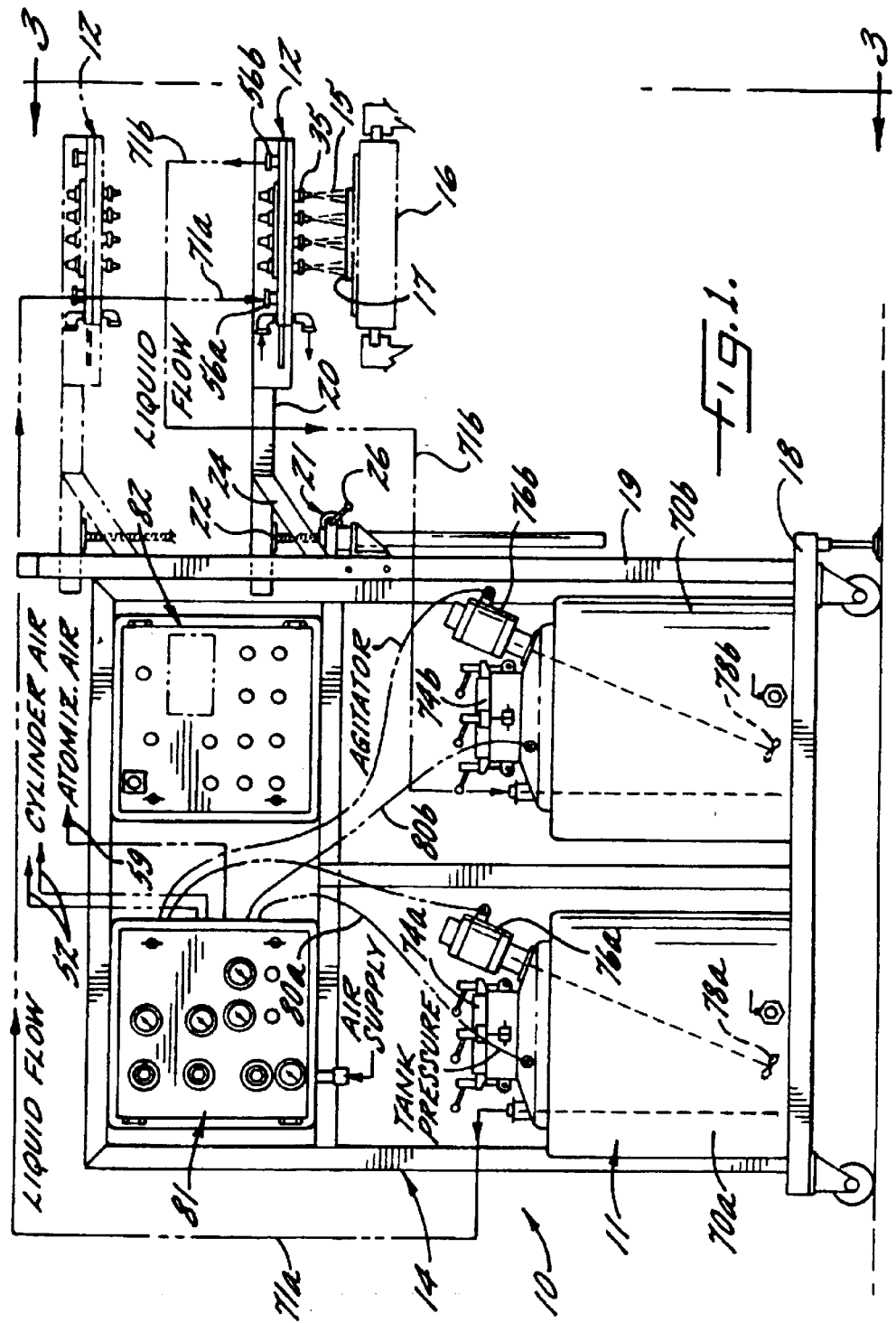
FIG. 1 is a side elevational view of a liquid spraying apparatus having a liquid supply and circulation system in accordance with the invention.
Figure 2:
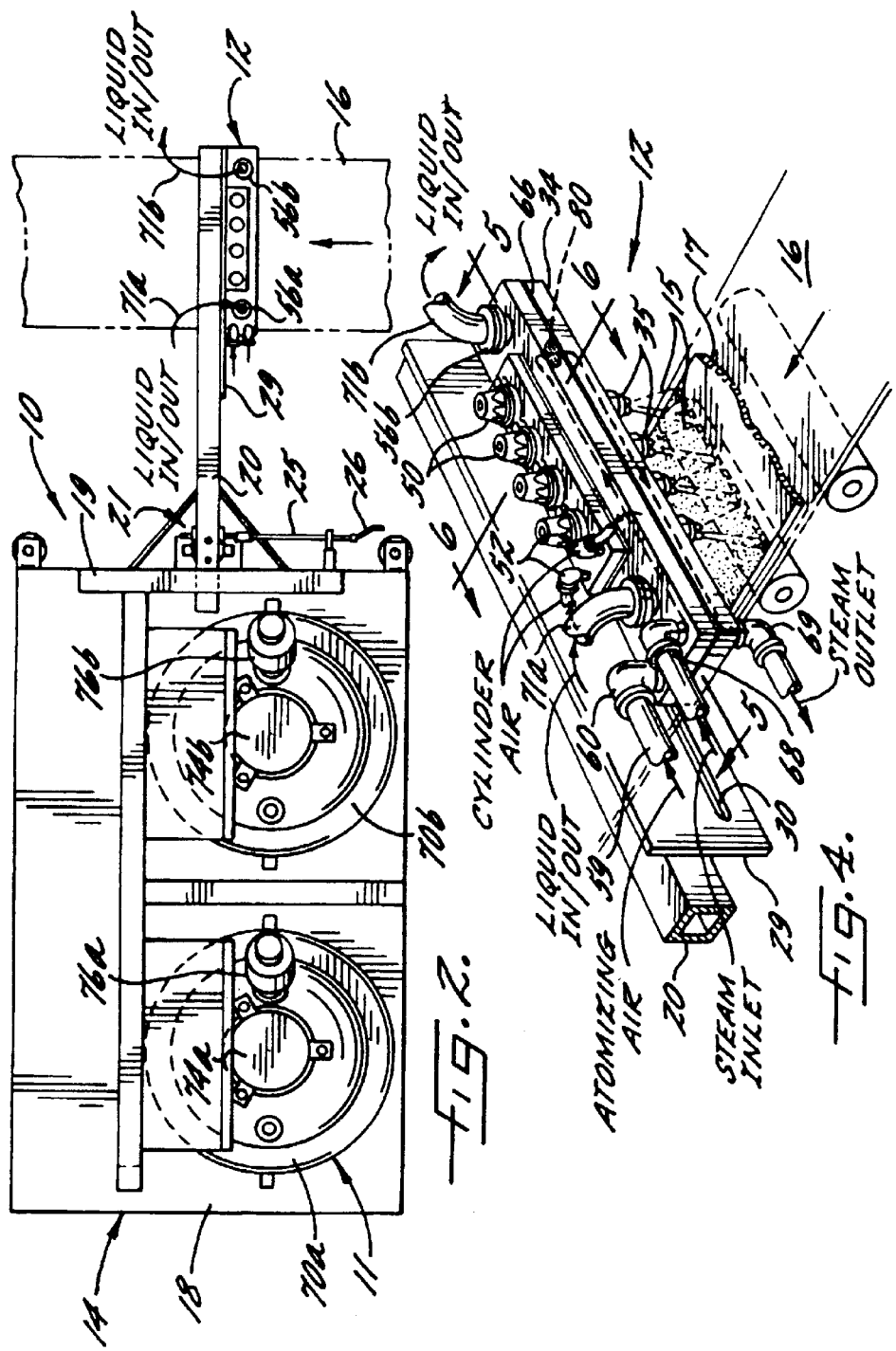
FIG. 2. is a top view of the spraying apparatus shown in FIG. 1.
Figure 7:
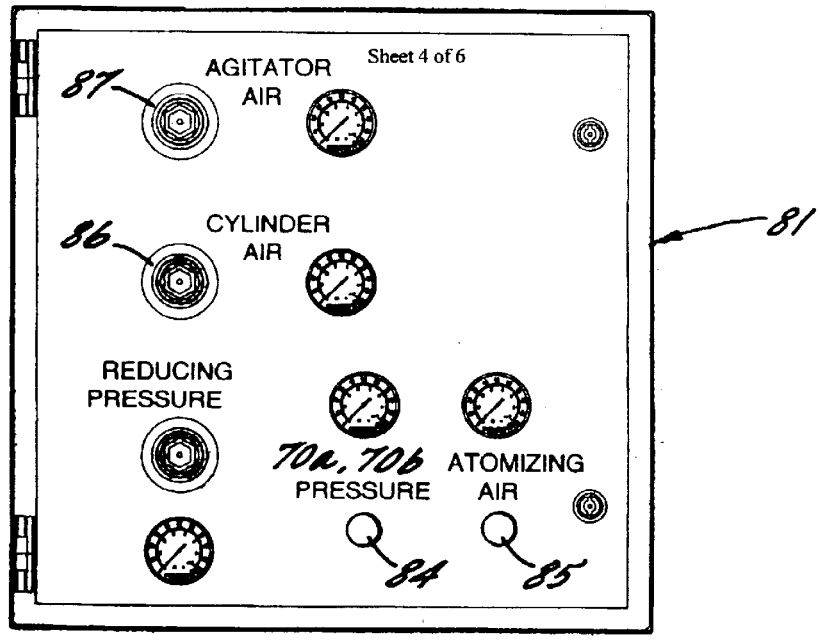
FIGS. 7 and 8 are enlarged front elevational views of control panels of the illustrated spray apparatus.
Figure 8:
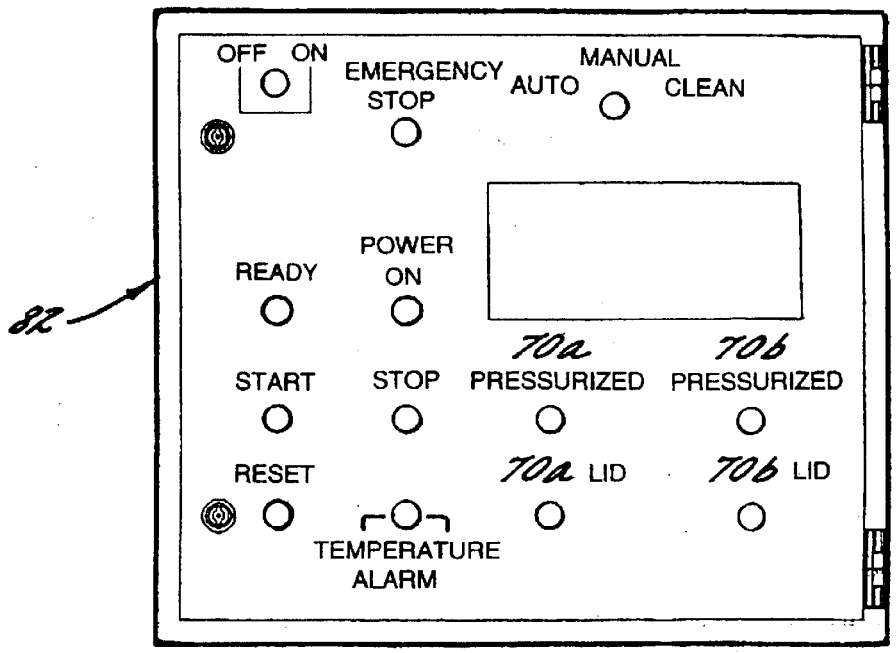

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to the drawings, there is shown an illustrative spraying apparatus 10 having a liquid supply and circulation system 11 in accordance with the invention. The spraying apparatus 10 in this instance includes a spray header 12 which is supported on a movable skid or platform 14 and adapted for directing a transverse curtain of liquid spray 15, such as a heated liquid chocolate, for coating a substrate 17 supported on a conveyor belt 16 moving under the spray header 12. As will become apparent to one skilled in the art, the spray apparatus 10 may be used to spray various liquid substances, including foods, pharmaceuticals, chemicals, or like substances, in different processing environments. The skid 14 in this case has a wheeled base 18 with an upstanding vertical support structure 19 which carries a horizontal spray header support arm 20 for selected vertical positioning.

For permitting adjustable vertical positioning of the header support arm 20, and hence the spray header 12 mounted thereon, a screw jack 21 is mounted in lateral spaced relation to the support structure 19. The screw jack 21 includes a screw 22 that is rotatably supported by the support structure 21 and a support bracket 24 (FIG. 1) to which the support arm 20 is fixedly mounted for vertical movement in response to rotation of the screw 22. For rotating the screw 22, a right angle worm gear screw 25 is provided, which is rotatable by a hand crank 26 located at a side of the apparatus 10. For guiding vertical movement of the arm supporting bracket 24, the bracket 24 includes a pair of mounting bearings 28 that move on guide rods 29 carried by the support structure 19 in parallel relation to and on opposite sides of the screw 22. Hence, by rotation of the hand crank 26, the screw jack bracket 24, support arm 20, and spray header 12 are selectively adjustable vertically relative to the conveyor belt 16.

For permitting limited horizontal adjustment in position of the spray header 12 on the support arm 20, the spray header 12 is supported on the mounting arm 20 by means of a vertical plate 29 (FIGS. 4 and 6) having a horizontal slot 30. The spray header 12 is secured to the vertical plate 29 by mounting screws 31, which upon loosening, enable limited horizontal adjustment of the spray header 12 along the plate slots 30 for precise positioning with respect to the conveyor.

The illustrated spray header 12 is of the type disclosed in U.S. application Ser. No. 10/054,280, assigned to the same assignee as the present application, the disclosure of which is incorporated herein by reference. The spray header 12 includes a header block 34 that supports a row of laterally spaced spray nozzles 35 for directing a transverse curtain of liquid spray. Each of the illustrated spray nozzles 35, as best depicted in FIG. 6, comprises a nozzle body 36 having an upstream stem 38 threaded into an underside of the header block 34 and an air cap 39 secured on a discharge end of the nozzle body 36 by a retaining nut 40. The nozzle body 36 is formed with a central liquid passage 41 for directing a supply liquid through a tip insert 42 mounted in a downstream end of the liquid passage 41 in coaxial aligned relation to a spray discharge orifice 44 in the air cap 39. The nozzle body 36 further has one or more side passages 45 for communicating pressurized air to an annular air chamber defined between the cap 39 and nozzle body 36 in surrounding relation to the tip insert 42 for intermixing pressurized air with liquid directed through the liquid passage 41 and tip insert 42 for preatomizing and discharging of the liquid spray from the nozzle cap discharge orifice 44.

For controlling the discharge of liquid spray from the nozzles, each nozzle 35 has a respective actuator or air cylinder 50 mounted on an opposite upper side of the header block 34 with an elongated valve needle 51 thereof being spring biased downwardly toward a valve closing position. The valve needle 51 is movable axially in the opposite direction (upwardly in FIG. 1) against the spring biasing force by pressurized air or other fluid supplied to the actuator 50. It will be appreciated, therefore, that the valve needles 51 of each of the spray nozzles 35 supported by the header 12 may be operated between on and off positions through selected supply of pressurized fluid to the respective actuator. For this purpose, the spray header 12 has pressurized air inlet lines 52 which communicate air through the header block 34 to the actuators or cylinders 50 as described in the afore-referenced patent application.

For directing a supply liquid to the nozzles 35, the header body 34 is formed with a liquid supply passage 55, which communicates with each of the spray nozzles 35 and extends longitudinally through the header between inlet/outlet fittings 56a, 56b at opposite ends thereof. For directing atomizing air to the nozzle body air passages 45, the header 12 also defines an atomizing air passage 58 which communicates pressurized atomizing air from a supply line 59 and inlet elbows 60 with the side passages 45 of the nozzle bodies 36.

In order to maintain the supply liquid at a predetermined temperature for efficient spraying, the header block 34 defines juxtaposed passages 64, 65 (FIG. 6), which are separated along their length by an interposed gasket 66, through which a heating fluid is directed. An inlet elbow 68 (FIGS. 4 and 5) connected to a heating fluid (such as steam or hot water) supply line is mounted on the top of an end header block 34 in fluid communication with the upper passage 64. An outlet elbow 69 connected to a steam outlet and recirculating line is mounted on an underside of the same end of the header block 34 in communication with the lower passage 65. Steam directed into the inlet elbow 68 proceeds along the upper passage 64 substantially the length of the header block 34 then communicates through an aperture 80 in the gasket 66 (FIG. 4) communicating between the passages 64, 65 for return through the lower passage 65 to the outlet elbow 69.

In accordance with the invention, the spraying apparatus has a liquid supply and circulation system that includes a plurality of selectively pressurizable supply liquid tanks which each have a respective fluid conduit coupled to the spray head and which are successively operable for directing pressurized supply liquid to the spray head from the plurality of tanks without disconnecting the fluid conduits of the tanks from the spray head. More particularly, the liquid supply and circulation system of the invention includes first and second liquid supply tanks, and the liquid supply system has (1) a first cycle of operation in which the first tank is pressurized and the second tank is depressurized so that pressurized liquid is supplied from the first tank to the spray head and return liquid from the spray head is directed to the second tank and (2) a second cycle of operation in which the second tank is pressurized and the first tank is depressurized so that pressurized liquid is supplied to the spray head from the second tank and return liquid is directed to the first tank. To this end, the illustrated liquid supply and circulation system 11 includes a first pressurizable tank 70*a* having a first fluid conduit 71*a*, which preferably is heated, coupled to one of the inlet/outlet fitting 56*a* on the spray header 12, and a second pressurizable tank 70*b* having a second fluid conduit 71*b*, also preferably heated, connected to the other inlet/outlet fitting 56*b* at the opposite end of the spray header 12. Each tank 70*a*, 70*b* has a respective removable and/or replaceable cover 74*a*, 74*b* to enable filling of the tank with a supply liquid to be sprayed. The tanks 70*a*, 70*b* in this case each have a vertical sight tube 75 (FIG. 3) which provides a visual indication of the liquid level within the tank. In order to agitate the liquid contained within the tanks so that it remains in motion at all times, each tank 70a, 70b has a respective agitator 76a, 76b having an agitator blade 78a, 78b rotatably driven by a fluid air operated motor. Fluid air pressure to the agitator motors can be adjusted by a pressure regulator 87 on a valve enclosure 81.

For enabling selective pressurization of the tanks 70a, 70b, each tank has a respective pressurized air inlet line 80a, 80b with a respective control valve, which in this case is contained within the valve enclosure 81 and operated from a controller 82. Each tank 80a, 70b thereby may be selectively pressurized or depressurized. It will be understood that upon pressurization of a selected one of the tanks 70a, 70b and depressurization of the other tank, a pressurized liquid flow stream will be directed to the spray header 12 via the conduit of the selected pressurized tank. Pressure within the selected pressurized tank preferably can be adjusted by an appropriate pressure regulator 84 on the valve enclosure 81. Manual control of the atomizing air to the spray nozzles 35 and cylinder air to the valve actuators 50 also preferably can be manually adjusted by pressure regulators 85, 86 on the valve enclosure 81.

In carrying out the invention, the liquid supply and circulation system includes an electronic control system that monitors fluid levels in the tanks and controls liquid direction and circulation through the spraying system in response thereto. In the illustrated embodiment, each of the tanks 70a, 70b has a liquid level sensor 88a, 88b for indicating when the liquid within the tank is lowered to a predetermined low level. Based upon the sensor indications, the controller will not initiate direction of liquid from a selected tank to the spray header unless the presence of a liquid above the predetermined level exists in the tank. Likewise, the supply of liquid will be interrupted in response to the sensor indicating that the liquid has been lowered to the predetermined low level.

Figure 9A:
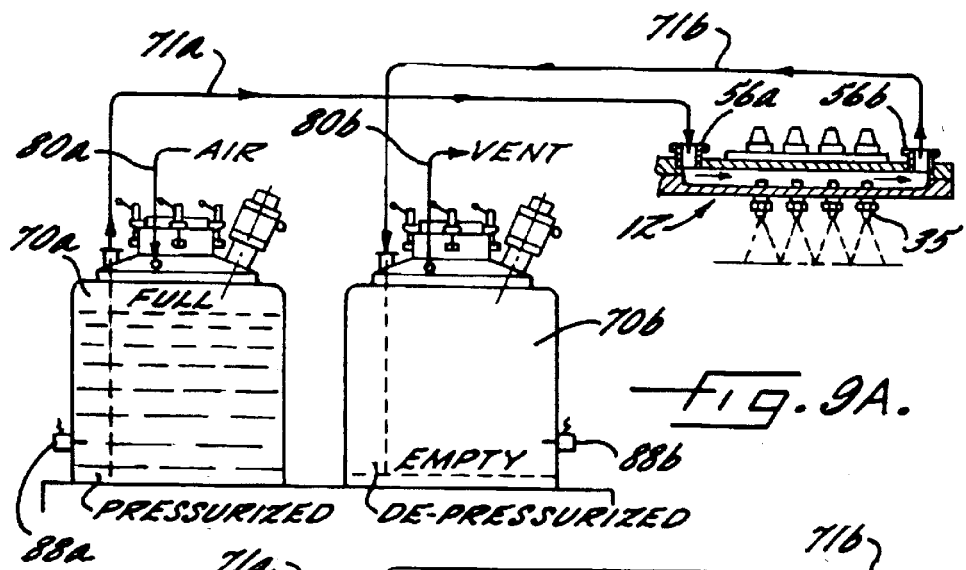
FIGS. 9A–9C are partially diagrammatic, sequential depictions of the operation of the illustrated liquid supply and circulation system.
Figure 9B:
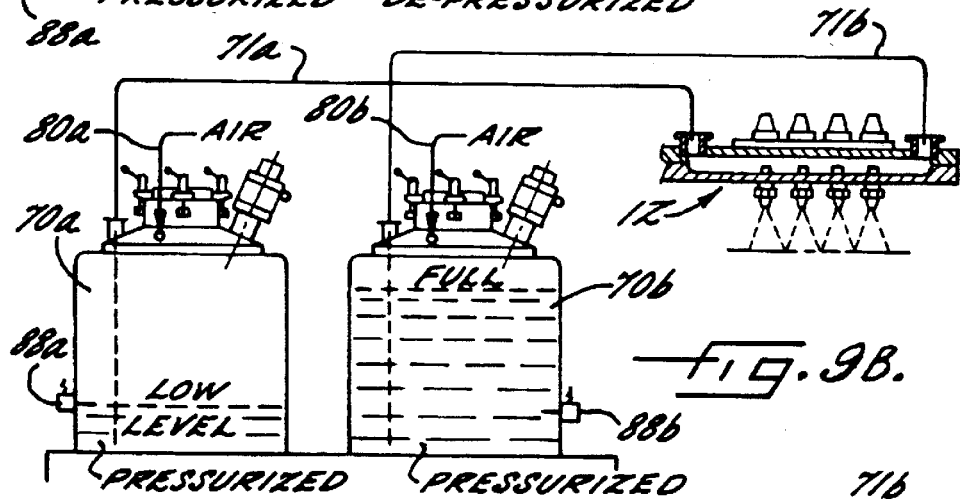
Figure 9C:
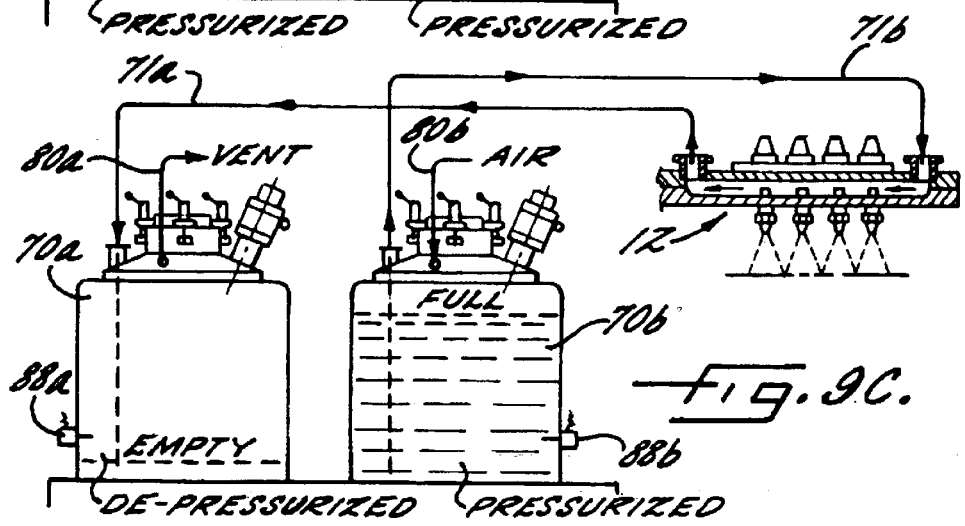

A typical operation of the liquid circulation and supply system 11 is depicted in FIGS. 9A–9C. To initiate the supply of liquid from the tank 70a to the spray header 12, the controller 82 will first verify, via the sensor 88a, that supply liquid is contained in the first tank 70a above the minimum low level. If that is verified to be the case, the first tank 70a is pressurized through the direction of pressurized air to the tank through the inlet line 80a, and the second tank 70b is depressurized causing supply liquid to be directed through the first conduit 71a to the spray header 12 where at least a portion of the supply liquid is directed through the plurality of nozzles 35 as a discharging spray and the remaining liquid which passes through the spray header 12 without being sprayed (i.e. the return liquid) is directed through the second line 71b to the depressurized second tank 70b, as depicted in FIG. 9A. This operation continues until the liquid level in the first tank 70a reaches the predetermined low level, as indicated by the sensor 88a.

Upon the sensor 88a indicating the low liquid level in the first tank 70a and the controller determining via the sensor 88b the presence of supply liquid in the second tank 70b above the predetermined low level, the controller 82 will initiate pressurization of the second tank 70b through the direction of pressurized air through the inlet line 80b as depicted in FIG. 9B, and within a predetermined relatively short period thereafter, the first tank 70a is depressurized (as depicted in FIG. 9C). The second tank 70b then causes material to flow from the second tank 70b through the second line 71b to the spray header 12, which directs at least a portion of the liquid through the spray nozzles 35 with the remainder of the liquid which is not sprayed (i.e. return liquid) being returned through the first conduit 71a to the depressurized first tank 70a. This operation continues until the liquid in the second tank 70b reaches the predetermined low level as determined by the sensor 88b, which then again triggers reversal of the supply tank from which liquid is directed to the spray header 12. This repeating process continues until the liquid level sensors 88a, 88b on both tanks 70a, 70b indicate a low liquid level, at which time the controller activates an alarm to indicate the need to refill one of the tanks.

Referring now to FIG. 10, there is shown an alternative embodiment of the invention adapted for automatic refilling of the tanks and continued uninterrupted spraying. Items similar to those described above have been given similar reference numerals. In this embodiment, an auxiliary liquid supply container 90 is provided, which has a supply line 91 connected to the first tank 70a through a solenoid control valve 92. The second tank 70b is provided with a medium liquid level sensor 94 for indicating a medium level of liquid in the tank. The controller 82 is programmed so that when the liquid level in the first tank 70a is at the low level and the liquid level in the second tank 70b is lowered to the medium level, the first tank 70a is depressurized and the solenoid valve 92 opened to enable automatic filling of the first tank 70a to a predetermined high level, as sensed by a high liquid level sensor 95, at which time the control valve 92 is closed. It will be appreciated by one skilled in the art that such refilling can take place when the first tank 70a is in a depressurized state and the system is in operation directing liquid to the spray header 12 from the second tank 70b. Preferably, the auxiliary liquid supply tank 90 is disposed at a higher elevation than the tank 70a for permitting gravity feed of the supply liquid.

Figure 11:
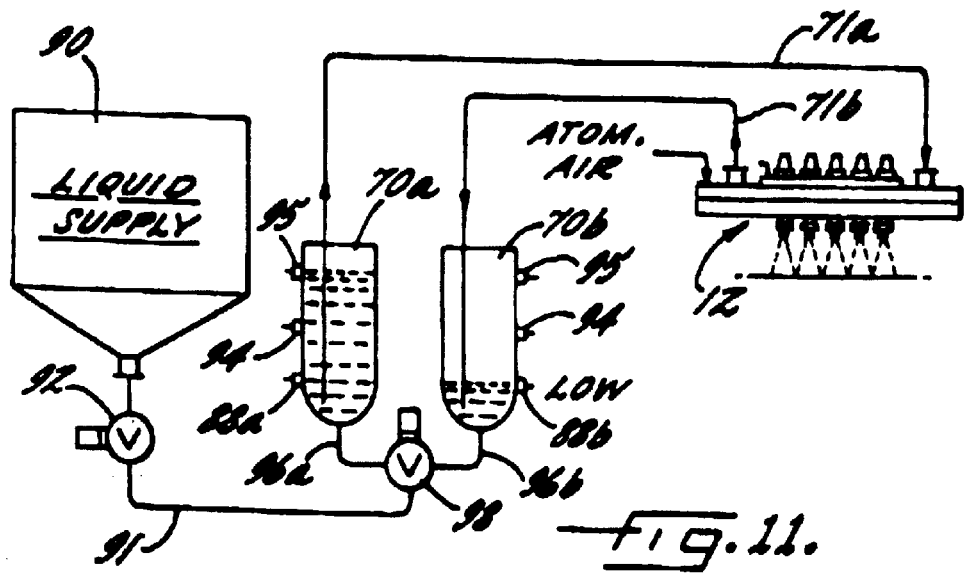
FIG. 11 is a partially diagrammatical illustration of another alternative embodiment of liquid supply and circulation system having an auxiliary liquid supply tank which can be selectively connected to any one of the plurality of the liquid supply and return tanks of the spraying apparatus.

Referring now more particularly to FIG. 11, as shown in another alternative embodiment of the invention having an auxiliary liquid supply container 90 adapted for refilling either of the two liquid supply and return tanks 70a, 70b without interrupting a spraying operation. In this embodiment, the auxiliary liquid supply tank 90 is connectable to both the first tank 70a and second tank 70b through a primary auxiliary liquid supply line 91 which communicates with individual tank inlet lines 96a, 96b through a three-way refill control valve 98, such as a solenoid-operated three-way ball valve, which is actuatable between an off position and liquid supply positions communicating with either the inlet line 96a or inlet line 96b. The auxiliary liquid supply tank 90 again has a shutoff valve 92, such as a two-way solenoid control valve, disposed in the primary liquid supply line 91.

In operation, under the control of the controller, with the first tank 70a pressurized and the second tank 70b vented, similar to the previous embodiments, liquid is directed to the spray header 12 from the first pressurized tank 70a with a portion of the liquid being sprayed from the spray header and a portion being recirculated to the second tank 70b via the return line 71b. With the liquid level in the second tank 70b having previously been at a low level, as indicated by the low level sensor 88b, the storage tank valve 92 is opened and the three-way valve 98 is actuated to direct liquid from the auxiliary supply tank 90 to the second tank 70b. When the liquid in the second tank 70b reaches a predetermined level, such as a midlevel as determined by the sensor 94, the auxiliary liquid supply tank valve 92 is closed, and the recirculation of liquid from the first tank 70a to the second tank 70b continues during spraying until the liquid level in the second tank 70b reaches an upper limit as determined by a sensor 95. In response thereto, the second tank 70b is pressurized and the first tank 70a vented, for causing the direction of liquid from the second tank 70b to the spray header and return liquid to the first tank 70a. Following successive alternative pressurizations of the first and second tanks 70a, 70b in such manner, when one of the tanks 70a, 70b reaches a predetermined low level, as determined by the respective low level sensor, the other tank is pressurized, the low level tank vented, the auxiliary supply tank valve 92 is opened, and the three-way valve 98 is actuated to direct liquid from the auxiliary liquid supply line 91 to the low level tank to start another filling cycle. Hence, in this embodiment, the auxiliary liquid supply tank 90 is effective for selectively refilling, on a demand basis, either of the plurality of liquid supply and return tanks 70a, 70b.

Figure 12:
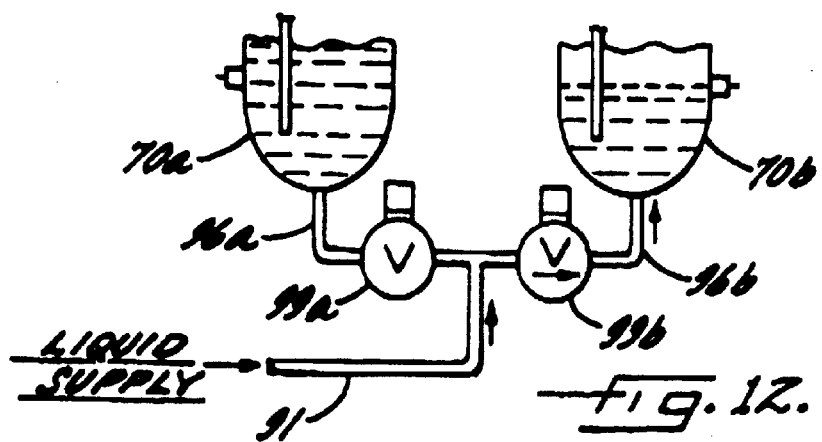
FIG. 12 is a depiction of a liquid supply and recirculation system, similar to FIG. 11, but with an alternative control valve arrangement between the auxiliary liquid supply tank and the supply and return tanks of the spraying apparatus.

With reference to FIG. 12, a spraying apparatus, similar to that depicted in FIG. 11, is shown with the exception that instead of a three-way control valve, tank inlet lines 96a, 96b each have a respective two-way (on and off) solenoid-operated valve 99a, 99b for controlling the supply of liquid from the primary auxiliary liquid supply line 91 to the selected supply tank 70a, 70b. In this case, the selected valve 99a or 99b for the low level tank is actuated to an on position to permit communication of liquid from the auxiliary liquid supply to the low level tank while the other control valve 99a or 99b remains in an off position.

Figure 13:
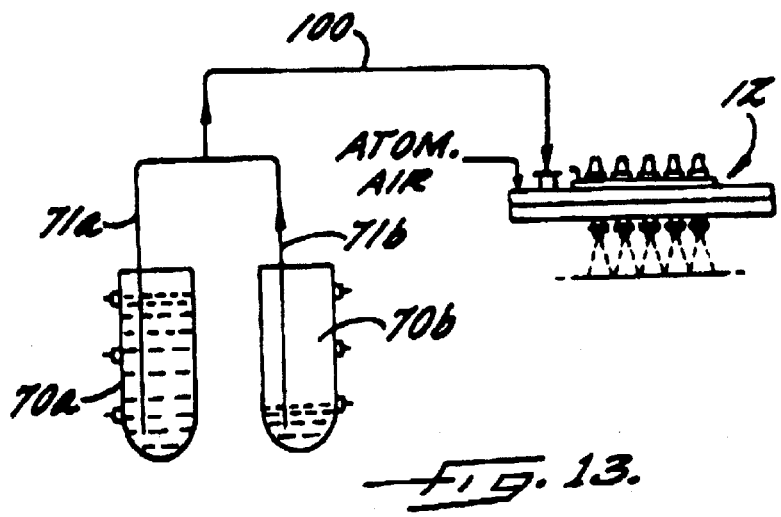
FIG. 13 is a schematic of still another embodiment of an alternative embodiment of a liquid spray application with a multiple tank liquid supply and return tanks.

With reference to FIG. 13, there is shown a further alternative embodiment of a spraying apparatus which does not include recirculation back from the spray header. In this case, the plurality of liquid supply tanks, namely the tanks 70a, 70b, have respective liquid supply lines 71a, 71b coupled to a common liquid supply line 100 communicating with an inlet fitting of the spray header 12. Liquid supply from the tanks 70a, 70b can be operated, under the control of the controller, through alternative pressurization and venting of the tanks, as described above. In this instance, all liquid directed to the spray header through the supply line 99, whether from the tank 70a or 70b, is emitted as a discharging spray without recirculation to the tanks.

From the foregoing, it can be seen that the liquid supply and circulation system of the present invention, which is particularly adapted for use with tyxotropic liquids, eliminates the need for costly pumps and the tedious handling of return liquid from the spray nozzle or header. The liquid supply system further can be operated on a substantially uninterrupted basis and is adapted to permit efficient refilling of the liquid supply tanks.

What is claimed is:

1. A liquid spraying system comprising:
 a spray head having at least one spray nozzle for discharging a liquid spray,
 a liquid supply system for directing pressurized supply liquid to the spray head,
 said liquid supply system including first and second liquid containable tanks connectable to said spray head,
 said liquid supply system having a first operating cycle of operation in which liquid is directed from said first tank to said spray head, and
 a control responsive to the liquid level in said first tank being lowered to a predetermined level for initiating a second operating cycle in which liquid is directed from said second tank to said spray head and the direction of liquid from said first tank to said spray head is terminated.

2. The liquid spraying system of claim 1 in which said control is responsive to the liquid level in said first tank being lowered to said predetermined level and the liquid in said second tank being above a predetermined level for initiating said second operating cycle.

3. The spraying system of claim 1 including an auxiliary liquid supply, and said control being responsive to the liquid level in at least one of said tanks being lowered to a predetermined level for initiating a refill cycle in which liquid is directed from said auxiliary liquid supply to said at least one tank.

4. The spraying system of claim 1 including an auxiliary liquid supply, and said control is responsive to the liquid level in said tanks both being lowered to a predetermined level for initiating a refill cycle in which liquid is directed from said auxiliary liquid supply to one of said tanks.

5. The spraying system of claim 3 in which said auxiliary liquid supply is selectively connectable to each of said first and second tanks, and said control being responsive to liquid in said first tank being lowered to a predetermined level for initiating a first refill cycle in which liquid is directed from said auxiliary liquid supply to said first tank, and said control being responsive to liquid in said second tank being lowered to a predetermined level for initiating a second refill cycle in which liquid is directed from said auxiliary liquid supply to said second tank.

6. The liquid spraying system of claim 5 in which said auxiliary liquid supply is connected to the first and second tanks through a pair of inlet lines each coupled to a respective one of the first and second tanks.

7. The liquid spraying system of claim 6 including a three-way control valve coupled between said inlet lines and said auxiliary liquid supply for selectively directing liquid from the auxiliary liquid supply to one of the first and second tanks based upon the setting of said three-way valve.

8. The liquid spraying system of claim 7 in which said auxiliary liquid supply is connected to said liquid inlet lines through a primary auxiliary liquid supply line, said three-way control valve being coupled between said primary auxiliary supply line and inlet lines.

9. The liquid spraying system of claim 6 in which said liquid supply inlet lines each include a respective selectively operable liquid control valve.

10. The liquid spraying system of claim 3 in which said first and second tanks each have a respective liquid level sensor, and said control being responsive to the liquid level sensor of the first tank sensing a predetermined low level for initiating a first refill cycle in which liquid is directed from said auxiliary liquid supply to said first tank, and said control being responsive to the liquid level sensor of the second tank sensing a predetermined low level of liquid in the second for initiating a second refill cycle in which liquid is directed from said auxiliary liquid supply tank to said second tank.

11. A liquid spraying system comprising a spray head having at least one spray nozzle for discharging a liquid spray, a liquid supply system for directing pressurized supply liquid to the spray head for causing a spray to be discharged from said spray head, said liquid supply system including two selectively pressurizable liquid containable tanks, said tanks each having a respective fluid conduit coupled to said spray head, and said liquid supply system being operable for successively (1) directing a pressurized fluid to one of said tanks while the other of said tanks is vented to atmosphere for directing liquid from said one tank to said spray head for discharge from said at least one spray nozzle and (2) directing a pressurized fluid to the other of said tanks while said one tank is vented to atmosphere for directing liquid from said other tank to said spray head for discharge from said at least one spray nozzle.

12. A liquid spraying system comprising:
a spray head having at least one spray nozzle for discharging a liquid spray,
a liquid supply system for directing pressurized supply liquid to the spray head,
said liquid supply system including first and second liquid containable tanks connectable to said spray head,
said liquid supply system having a first operating cycle of operation in which liquid is directed from said first tank to said spray head, and
a second operating cycle in which liquid is directed from said second tank to said spray head and the direction of liquid from said first tank is terminated,
an auxiliary liquid supply connectable to at least one of said first and second tanks,
said first and second tanks each having a respective liquid level sensor, and
a control in responsive to receiving a signal from at least one of said sensors for initiating a liquid refill cycle wherein liquid from said auxiliary liquid supply is directed to at least one of said tank.

13. The liquid spraying system of claim 12 in which said control is responsive to signals from the sensors of both said first and second tanks for initiating a refill cycle.

14. The liquid spraying system of claim 12 in which said auxiliary liquid supply is connected to only one of said tanks.

15. The liquid spraying system of claim 12 in which said auxiliary liquid supply is connectable to both of said first and second tanks, and a valve operable by said control for selectively directing liquid from said auxiliary liquid supply to either said first or second tanks.

16. A liquid spraying system comprising a spray head having at least one spray nozzle for discharging a liquid spray, a liquid supply system for directing pressurized supply liquid to the spray head with a portion of the supply liquid being directed from said spray head as a discharging spray and a portion of the supply liquid exiting the spray head as a return liquid,
said liquid supply system including first and second selectively pressurizable liquid containable tanks,
said first tank having a first fluid conduit coupled to said spray head,
said second tank having a second fluid conduit coupled to said spray head,
said liquid supply system having a first operating cycle of operation in which said first tank is pressurized and said second tank is depressurized so that pressurized liquid is supplied from said first tank to said spray head and return liquid is directed through said second conduit to said second tank,
said liquid supply system having a second operating cycle of operation in which said second tank is pressurized and said first tank is depressurized so that pressurized liquid is supplied to said spray head from said second tank through said second conduit and return liquid is directed through said first conduit to said first tank,
an auxiliary liquid supply connectable to each of said first and second tanks, and
a control responsive to the liquid level in at least one of said tanks being lowered to a predetermined level for causing the direction of said liquid from said auxiliary liquid supply to said at least one tank.

17. The liquid spray system of claim 16 in which control is responsive to the liquid levels in both said tanks being lowered to a predetermined level for causing the direction of liquid from said auxiliary liquid supply to said at least one tank.

18. The liquid spraying system of claim 17 in which said auxiliary liquid supply is connected to the first and second tanks through a pair of inlet lines each coupled to a respective one of the first and second tanks.

19. The liquid spraying system of claim 18 including a three-way control valve coupled between said inlet lines and said auxiliary liquid supply for selectively directing liquid from the auxiliary liquid supply to one of the first and second tanks based upon the setting of said three-way valve.

20. The liquid spraying system of claim 19 in which said auxiliary liquid supply is connected to said liquid inlet lines through a primary auxiliary liquid supply line, said three-way control valve being coupled between said primary auxiliary supply line and inlet lines.

21. The liquid spraying system of claim 18 in which said liquid supply inlet lines each include a respective selectively operable liquid control valve.

22. The liquid spraying system of claim 17 in which said first and second tanks each have a respective liquid level sensor, and said control being responsive to the liquid level sensor of the first tank sensing a predetermined low level for initiating a first refill cycle in which liquid is directed from said auxiliary liquid supply to said first tank, and said control being responsive to the liquid level sensor of the second tank sensing a predetermined low level of liquid in the second for initiating a second refill cycle in which liquid is directed from said auxiliary liquid supply tank to said second tank.

23. A method of supplying liquid to a spray head having at least one spray nozzle comprising the steps of providing first and second pressurizable liquid containable tanks, filling the first tank with supply liquid to a level above a predetermined low level, directing liquid from said first tank to said spray head for discharging a liquid spray from said spray head, sensing the level of liquid in said first tank, and responsive to the liquid level in said first tank being lowered to a predetermined level automatically directing liquid from said second tank to said spray head and terminating the direction of liquid from said first tank to said spray head.

24. The method of claim 23 including providing an auxiliary liquid supply, sensing the liquid level in both of said tanks, and in response to the liquid level in one of said tanks being lowered to a predetermined level automatically directing liquid from said auxiliary liquid supply to said tank in which the predetermined low level of liquid has been sensed.

25. The method of claim 24 including directing liquid from said first tank to said spray head by selectively pressurizing said first tank, and directing liquid from said second tank to said spray head by selectively pressurizing said second tank.

26. A liquid spraying system comprising a spray head having at least one spray nozzle for discharging a liquid spray, a liquid supply system for directing pressurized supply liquid to the spray head for causing a spray to be discharged from said spray head, said liquid supply system including a plurality of selectively pressurizable liquid containable tanks, said tanks each having a respective fluid conduit coupled to said spray head, said tanks each having at least one liquid level sensor, and a control responsive to receiving signals from said liquid level sensors for successively directing liquid from said plurality of tanks to said spray head without disconnecting the fluid conduits of said tanks from said spray head.

27. A liquid spraying system comprising a spray head having at least one spray nozzle for discharging a liquid spray, a liquid supply system for directing pressurized supply liquid to the spray head for causing a spray to be discharged from said spray head, said liquid supply system including a plurality of selectively pressurizable liquid containable tanks, said tanks each having a respective fluid conduit coupled to said spray head, said liquid supply system being operable for successively directing pressurized liquid to said spray head from said plurality of tanks without disconnecting the fluid conduits of said tanks from said spray head, said liquid supply system having a first cycle of operation in which liquid is directed from one of said tanks to said spray head and a second cycle of operation responsive to the liquid in said one tank being lowered to a predetermined level for initiating a second cycle of operation in which liquid is directed from another of said tanks to said spray head.

28. The liquid spraying system of claim 27 including an auxiliary liquid supply, and a control responsive to the liquid level in one of said tanks being lowered to a predetermined level for initiating a refill cycle in which liquid is directed from said auxiliary liquid supply to said one tank.

\* \* \* \* \*